United States Patent [19]

French

[11] 4,341,202

[45] Jul. 27, 1982

[54] PHASE-CHANGE HEAT TRANSFER SYSTEM

[75] Inventor: Roger F. French, Jackson, N.H.

[73] Assignee: Aptec Corporation, Los Angeles, Calif.

[21] Appl. No.: 112,939

[22] Filed: Jan. 17, 1980

Related U.S. Application Data

[63] Continuation of Ser. No. 870,624, Jan. 19, 1978, abandoned.

[51] Int. Cl.³ .............................................. F24J 3/02
[52] U.S. Cl. .................................. 126/433; 126/428; 126/423; 165/104.21; 165/104.22; 62/235.1
[58] Field of Search ............... 126/417, 422, 423, 419, 126/432, 433, 435, 452, 900, 428; 165/105, 106; 62/115, 235.1; 138/30

[56] References Cited

U.S. PATENT DOCUMENTS

| | | | |
|---|---|---|---|
| 1,794,448 | 3/1931 | Derby | 165/105 X |
| 2,695,753 | 11/1954 | Kirk, Jr. | 138/30 X |
| 2,961,476 | 11/1960 | Maslin et al. | 165/105 X |
| 3,390,672 | 7/1968 | Snelling | 126/433 |
| 4,024,726 | 5/1977 | Furner | 62/2 |
| 4,120,172 | 10/1978 | Pierce | 62/115 |
| 4,120,289 | 10/1978 | Bottum | 126/433 |

OTHER PUBLICATIONS

Daniels, F., *Direct Use of the Sun's Energy*, Yale University Press, 1964, pp. 115–116.
Williams, J. R., *Solar Energy Technology and Applications*, Arbor Science Publications 1974, pp. 39–44.
Duffie, J. A. and Bechman, W. A., *Solar Energy Thermal Processes*, Wiley Sons, Inc. 1974, pp. 231–235, 252–255, 264–267.
Loope, R., "A Discussion of Solar Domestic Water Heating", Report of the New England Solar Energy Association, First Annual Conference and Exhibition of the WESEA, 1967, pp. 441–412.
Jakus, K. and Tsai, K., "Absorption Cycle Solar Heat Pump," Report of the New England Solar Energy Association, First Annual Conference and Exhibition of the WESEA, 1976, pp. 479–485.

*Primary Examiner*—James C. Yeung
*Assistant Examiner*—Larry Jones
*Attorney, Agent, or Firm*—J. B. McGuire

[57] ABSTRACT

A phase-change heat transfer system which is self-controlled, self-pumping, and uses no moving parts. A heat collector device is connected in series with a condenser and an accumulator. The accumulator includes apparatus for regulating the pressure therein. A fluid capable of phase change within the system travels among the collector, condenser, and accumulator.

16 Claims, 1 Drawing Figure

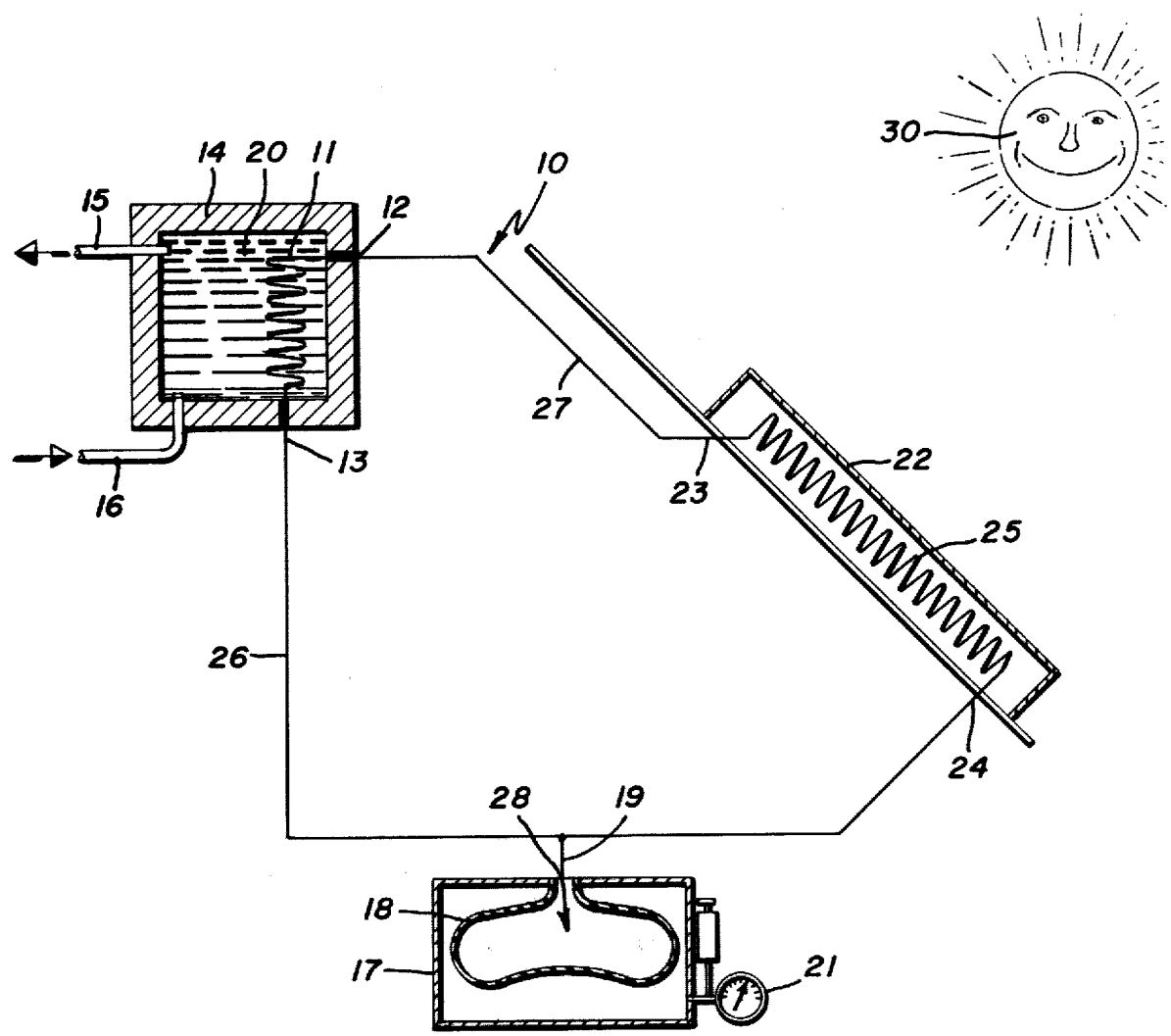

PHASE-CHANGE HEAT TRANSFER SYSTEM

RELATED APPLICATION

This is a continuation of U.S. application Ser. No. 870,624, filed Jan. 19, 1978, entitled SOLAR HEAT, and now abandoned.

BACKGROUND OF THE INVENTION

The presently available space heating and domestic hot water heating systems have several serious limitations in their performance and reliability. The heat transfer mechanism is inefficient and unreliable. The typical forced-liquid system requires a circulation pump which consumes electricity. The temperature differential between the collector and the water truck is quite large, e.g., 30° F. The coolant is usually corrosive and subject to freezing. Many coolants are highly toxic (hence hazardous) should there be incursion to the hot water system. The controls are complicated and may not prevent transfer of heat from the condenser to the collector. The typical installation is neither optimum nor reliable.

The thermal advantage of a phase-change system over a circulating-liquid system is apparent from corsideration of latent heat as opposed to sensible heat for energy transport. The heat absorbed using a circulating liquid is expressed by $$q = \dot{m} C_P (T_{out} - T_{in})$$

where $\dot{m}$ is the flow rate of circulating liquid, $C_P$ is the specific heat of the liquid, and $T_{out}$ and $T_{in}$ are the temperatures of the liquid leaving and entering the collector.

The comparable expression for the phase-change system in which liquid enters the collector, boils with no change in temperature, and leaves as a vapor, is $$q = \dot{m}(h_g - h_f)$$

where $h_g$ and $h_f$ are enthalpies of the vapor and liquid respectively, with their difference being the latent heat of vaporization.

The latent heat of a common refrigerant, Freon 114, is over 40 BTU/lb., compared to the specific heat of water of 1.0 BTU/lb-°F. This means that the circulating rate of the fluid for the phase-change system can be a small fraction of that of a circulating liquid, along with comparable elimination of external pumping power. Reduction of the circulating rate in the circulating liquid system would produce higher collector temperatures, accompanied by higher collector losses.

The standard pumped coolant system can neither maintain isothermal conditions within the collector nor provide the automatic maximum heat transfer in the transiently-cooled section of the tank when cold water enters caused by the increased condensing action at that point. Furthermore, the increase in heat transfer, as described above, in connection with a phase-change system, comes only from the collector; no heat is robbed from the upper portion of the tank which was previously heated. Thus, a beneficial stratification in the water tank is preserved despite the presence of the condenser. These and other difficulties experienced with the prior art devices have been obviated in a novel manner by the present invention.

It is, therefore, an outstanding object of the invention to provide a completely self-regulating heat recovery and transfer system.

Another object of this invention is the provision of a heat collection and transfer system which cannot freeze up.

A further object of the present invention is the provision of a heat collection and transfer system with improved heat transfer capability by using the phase change of the heat transfer fluid.

It is another object of the instant invention to provide a heat collection and transfer system which has no moving parts.

A still further object of the invention is the provision of a heat collection and transfer system which is more reliable and easily maintained than the prior art.

It is a further object of the invention to provide a heat collection and transfer system for which no outside controls are needed.

It is a still further object of the present invention to provide a heat collection and transfer system which eliminates many expensive and troublesome components.

Another object of the invention is the provision of a heat collection and transfer system which cannot lose heat from the condenser through the heat collector.

Another object of the invention is the provision of a heat collection and transfer system using a heat transfer medium which is non-corrosive.

Another object of the invention is the provision of a heat collection and transfer system using a heat transfer medium which has very low toxicity.

Another object of the invention is the provision of a heat collection and transfer system having a collector which is self-balancing and isothermal.

Another object of the invention is the provision of a heat collection and transfer system in which the stratification of the fluid to which heat is transferred in the condenser is improved.

Another object of the invention is the provision of a heat transfer and collection system in which heat always flows directly to the coldest point, improving system efficiency.

Another object of the invention is the provision of a heat transfer and collection system which will provide greater heat transfer and provide higher temperatures with otherwise unchanged collector and condenser capacities from more standard designs.

With these and other objects in view, as will be apparent to those skilled in the art, the invention resides in the combination of elements set forth in the claims appended hereto.

Another object of the invention is the maintenance of high efficiency, when the system is used as a solar heat collector, for example, even if the collector becomes partially shielded from the sun (such as caused by a tree or building) during part of the day.

Another object is the efficient operation of the system even if the installation requires some of the collector system to have difference orientations, i.e., as in the case of a solar heat collector, on both the east and west slopes of a roof.

Another object of this invention is to provide a good performance monitor for the system.

Another object of this invention is to provide an effective test for even very small leaks in the system.

SUMMARY OF THE INVENTION

The presently preferred embodiment of the invention comprises a solar water heater apparatus which uses phase-change heat transfer, including a condenser immersed in a water tank, a solar collector which evaporates the heat transfer medium, and in accumulator which acts as a regulator for the system. More generally, the invention relates to a heat collection and transfer system which utilizes the phase-change capability of a heat transfer medium and thus avoids the need for a pump for the heat transfer medium. Of course, the heat may be collected from any source, such as solar, exhaust gases, or heated waste water, and it may be transferred to any medium, such as water or gas, in the condenser.

BRIEF DESCRIPTION OF THE DRAWINGS

The character of the invention, however, may be best understood by reference to one of its structural forms, as illustrated by the accompanying drawing, in which:

The single FIGURE of drawings represents a somewhat schematic view of an apparatus, embodying the principles of the present invention in a preferred embodiment.

DESCRIPTION OF THE PREFERRED EMBODIMENT

Referring to the FIGURE, which best shows the general features of the invention in its presently preferred embodiment, a solar water heater, indicated generally by the reference numeral 10, is shown as comprising a condenser 11 having an upper inlet 12, and having a lower outlet 13. This condenser 11 may be immersed in a a relatively low temperature condensing fluid, such as water 20. The water may be held in an insulated tank or vessel 14, the tank having an upper outlet 15 and a lower inlet 16 for water to enter it. Situated below the condenser 11 and connected to the lower outlet 13 through a first conduit 26 is an accumulator 17, which, in the preferred embodiment, is of the bladder type. The accumulator may be located below or even above the collector, so long as it is connected to the system at a location which is below the collector, e.g., at or near the low point of the system so that the collector can be completely drained during shut-down. The accumulator 17 may have a bladder 18, an accumulator inlet 19, and a means 21 for regulating the pressure about the bladder 18 of the type manufactured under the trademark "EXTROL" by Amtrol Inc. of West Warwick, R.I. and shown and described in U.S. Pat. Nos. 2,695,753 and 3,035,614. Located above the acculator inlet and below the condenser outlet is the solar collector 22 which may be of the type manufactured under the trademark "SOLECTOR" by Sunworks Manufacturing of Somerville, N.J. The solar collector may comprise an upper outlet 23 which communicates with the condenser upper inlet 12 through a second conduit 27 and a lower inlet 24 which communicates with the accumulator inlet 19 by an extension of the first conduit 26. Within the solar collector itself may be an inside conduit 25 which connects the collector outlet 23 to the collector inlet 24 and which exposes a heat transfer medium 28, located at times within the conduit, to solar energy effects. This fluid heat transfer medium is located generally within a closed network formed by the condenser, the first conduit, the bladder, the solar collector conduit, and the second conduit.

The operation and advantages of the invention will now be readily understood in view of the above description. In an initial state the fluid heat transfer medium 28 (which in the preferred embodiment, is Freon 114) would lie substantially within the bladder 18 of the accumulator 17. In this initial state, the fluid level of the Freon 114 lies below the collector inlet 24. Some pressure, e.g., 70 psig, is applied to the bladder 18 through the pressure regulation device 21. This forces the fluid Freon 28 up into the system, particularly into the solar collector conduit 25. In other words, the pressure applied to the bladder by the device 21 must be great enough to force effectively all of the medium 28 out of the accumulator 17 and up into the system for the system to transfer heat from the collector to the condensor. When the desired temperature of the condensing fluid 20 is reached, dependant upon the pressure exerted by the regulation device 21, the pressure in medium 28 will exceed the pressure exerted on the bladder by the device 21. Only at that point does the accumulator serve any "useful" purpose (or even "exist") insofar as this system is concerned: the heat transfer medium 28 will drain into the accumulator and out of the collector. The bladder will expand against and overcome the force in the pressurizing chamber and the accumulator will thus act as a "thermostatic switch" to shut down the system. Since there is no medium 28 in the collector under these conditions, no effective heat transfer will occur until the temperature of the fluid 20 diminishes to a level at which the bladder again forces all of the medium 28 back into the system.

When the medium 28, e.g., Freon is forced back into the system, it will travel to the collector so that it may be evaporated by energy from the heat source, e.g., the sun 30. This increases the vapor pressure in the closed network and the less dense vapor rises up the conduit of the collector, through the collector outlet 23 to the condenser, by way of the second conduit 27. In this initial instant the condensing fluid is cool. The Freon vapor condenses, thus imparting its energy through the condenser walls to the water. Because of the placement of the water tank above the collector 22 and accumulator 17, gravity forces the condensed liquid Freon back towards the bladder 18.

To use the above example, the vapor pressure of Freon 114 is approximately 70 psig at 140° F. It follows, therefore, that this cycle of evaporation and condensation will continue until the temperature of the water 20 becomes slightly greater than 140° F. At that time, the vapor pressure within the closed network will slightly exceed 70 psig. Because of this greater pressure being exerted within the bladder, the bladder 18 will expand and thereby lower the liquid level of the Freon within the remainder of the system. Once the Freon level is below the collector inlet 24 and the liquid Freon is no longer exposed to the sun's energy, the evaporation will stop and with it the heat transfer.

At a later time, if the water 20 cools below 140° F., the vapor pressure within the system will decrease. This will cause the bladder 18 to contract and the Freon will again be forced into the collector 22 and the cycle will begin again. The efficiency of the system is further enhanced by the self-balancing feature of the phase-change system which forces the collector 22 to operate isothermally and hence at the greatest efficiency.

Due to the nature of the heat transfer medium, the heat transfer is concentrated at the coldest point within the hot water tank 14 and thus further increases system performance and efficiency. When some cold water enters through the cold water inlet 16, as hot water is removed through the hot water outlet 15, rapid condensation is caused around the lower part of the condenser 11, thus concentrating the heating at that point. This further lowers the vapor pressure and temperature in the Freon system. It also lowers the temperature in the collector 22 and increases further the efficiency of the collector. Furthermore, no heat is robbed from the upper part of the hot water tank 14 during this transient condition, thus preserving the beneficial stratification within the system.

The above-mentioned features further allow cascading of hot water flow in two or more tanks while operating the Freon coils in parallel. The self regulation of the final temperature and the concentration of heating at the coldest point in the tanks enhance the operation. This also provides a lower profile for the tanks and hence will fit within a greater number of home designs.

A novel feature of this system is that no heat energy can be transferred from the hot water tank 14 to the collector 22. This occurs because, if the collector 22 is cooler than the hot water 20, the liquid remains entirely within the collector and the vapor pressure is lower than that required to cause condensation within the condenser 11; hence no heat transfer can take place. If the water 20 surrounding the condensing coil 11 is cooler than the collector 22, condensing of the vapor will commence and efficient heat transfer will take place between the collector 22 and the water 20. Typical differential temperatures are less than 5° F.

From the above description it can be seen that the system provides its own thermostat, as well as providing a "thermodiode", so that heat can only flow in the proper direction. Further, the bladder accumulator prevents the release of Freon to the atmosphere and protects the system.

An alternate configuration where the hot water storage tank cannot be placed above the collector utilizes a condenser located above the collector rather than within or attached to the storage tank. The heat is transferred from this condenser to the storage tank by means of a circulating pump for forcing circulation of the storage tank water through the condenser. This then provides many of the benefits of the above system even though the optimum location of the storage tank is precluded.

A good performance monitor of the system is provided, since the pressure gauge within the pressure regulating devices 21 indicates the actual operating temperature of the collector until the regulated pressure is reached. It also indicates proper operation of the system. It is possible to provide an effective test for very small leaks in the system when Freon is used in the system, since a conventional commercial halogen-type leak detector functions very well. By its use, the integrity of the system is tested easily and effectively.

It is obvious that minor changes may be made in the form and construction of the invention without departing from the material spirit thereof. It is not, however, desired to confine the invention to the exact form herein shown and described, but it is desired to include all such as properly come within the scope claimed.

For example, the collector may be employed to collect heat from any suitable source, such as laundry waste water, furnace smoke stack gasses, etc. Similarly, the condenser may transfer the useful heat to any desired gas or liquid.

Further, in the preferred or any alternate embodiment, the pressure regulating device 21 may be used to control the heat transfer medium pressure, and thus the temperature at the system output. Those skilled in the art will realize that the only limitation here will be based upon the side of the system, the volume of the heat transfer medium in the system, and the particular characteristics of the medium.

I claim:

1. A heat collection apparatus using phase-change heat transfer comprising:
   a system including:
   a condenser housing including
   means for containing a condensing fluid therein;
   a condenser within the housing for transfer of heat from a phase-change fluid within the condenser to the condensing fluid within the housing and about the condenser;
   a heat collector located in a position for exposure of a phase-change fluid therein to a relatively high temperature; and
   closed circuit conduit means interconnecting the condenser and the heat collector for movement of heat therebetween via a phase-change heat transfer fluid within the system formed by the condenser, heat collector, and conduit means; and
   means attached to the system at a location vertically below the condensor and collector for removing sufficient phase-change fluid from the system, when the condensing fluid reaches a predetermined temperature, to prevent movement of heat through the system from the heat collector to the condenser.

2. The apparatus of claim 1 wherein
   said removal means comprises
   an accumulator having
   a housing,
   flexible means within, and sealed to, the walls of the housing to provide a first, fluid-receiving volume on one side of the flexible means and a second, pressurizing volume on the other side of the flexible means, and
   means for exerting sufficient pressure in the second volume to force all phase-change fluid out of the first volume when the condensing fluid is below a predetermined temperature and for allowing such withdrawal of the phase-change fluid into the first volume when the predetermined temperature is achieved by the condensing fluid.

3. The apparatus of claim 2 wherein
the accumulator is located entirely below the heat collector.

4. The apparatus of claim 2 wherein
the accumulator is connected to said system at a location below the heat collector.

5. Solar water heater making use of phase-change heat transfer, comprising:
(a) a condenser having an inlet and an outlet, which condenser is in contact with the water to be heated;
(b) a solar collector having a bottom inlet and a top outlet and having an inner conduit that connects the inlet and the outlet, the conduit being suitable for exposing a heat-transfer medium in the conduit to solar energy, the collector outlet being located below the condenser;
(c) conduits joining the outlet of the collector to the inlet of the condenser and the outlet of the condenser directly to the inlet of the collector to form a closed circuit;

(d) a phase-change liquid heat transfer medium located within the circuit; and (e) an accumulator having means for regulating the pressure therein at a pressure substantially equal to the vapor-pressure of the phase change fluid at a temperature corresponding to a maximum predetermined water temperature and having an inlet that is connected to the circuit below the collector.

6. A heat collection apparatus using phase-change heat transfer comprising:

an housing having an inlet and an outlet for the passage of a condensing fluid to be heated therethrough;

a condenser operatively related to said housing for transfer of heat from said condenser to a condensing fluid in said housing, said condenser having an heat transfer fluid inlet and outlet;

an heat collector means having a heat transfer fluid inlet and an outlet, said outlet being below said condenser fluid inlet;

means for locating said collector in a position for the exposure thereof to a relatively high temperature;

conduit means connecting said condenser outlet to said collector inlet and said collector outlet to said condenser inlet, all in fluid-tight relationship;

a phase-change fluid heat transfer medium in a system formed by said collector, condenser, and conduit means; and means for controlling the pressure of said phase-change fluid within said system for selecting a temperature of the fluid within said housing at which the transfer of heat from said collector to said condenser is effectively stopped.

7. The apparatus of claim 6 wherein
said heat collector means comprises
solar energy collection means suitably oriented relative to the sun for collection of such energy.

8. The apparatus of claim 6 wherein
said pressure controlling means comprises
means for accumulating a sufficient volume of said phase-change fluid as a liquid at a low point in the system, when the condensing fluid in said housing reaches a predetermined temperature, in a volume sufficient to effectively prevent further heating of the condensing fluid.

9. The apparatus of claim 8 wherein
said accumulating means comprises
a variable volume fluid-containment means and
means for exerting a selected pressure on said containment means for thus controlling and selecting said predetermined temperature of said condensing fluid.

10. The apparatus of claim 8 wherein
said pressure controlling means further comprises
means for forcing all of the said phase-change fluid out of said accumulating means and into said collector, condenser, and conduit means when the temperature of the condensing fluid is less than the predetermined temperature.

11. A phase-change heat collection system comprising:
a condenser located within a heat transfer chamber, said chamber having an inlet and an outlet for the passage of a relatively low temperature condensing fluid therethrough past said condenser;

a heat collector located so as to to be exposed to a relatively high temperature;

fluid passage means interconnecting said condenser and said collector such that the upper portion of said collector is below at least the upper portion of said condenser;

a phase-change fluid installed within said condenser, collector, and fluid passage means; and accumulator means connected to said system below said condenser outlet and collector inlet and comprising
a substantially air-tight chamber,
a diaphram within said chamber in communication with one of said condenser, collector, and fluid passage means for forming a first, fluid-tight variable volume for containment of said phase-change fluid, said diaphram also forming a second volume within said chamber opposite the volume for containment of the phase-change fluid, and means for exerting a predetermined pressure in said second volume to thereby force all of the phase-change fluid out of the first volume and into said condenser, collector, and fluid passage means when the relatively low temperature fluid is below a predetermined temperature, and to allow the first volume to receive sufficient phase-change fluid to effectively stop heat transfer from said collector to said condenser when the relatively low temperature fluid reaches the predetermined temperature.

12. A solar hot water apparatus using phase-change heat transfer fluid, comprising:

(a) a water vessel having a water inlet and outlet;

(b) a condenser located in the vessel so as to be in contact with water in the vessel and having
a phase-change fluid inlet and outlet;

(c) an accumulator having
an inlet which is connected to the apparatus near the low point of travel of a heat-transfer fluid therethrough,
a substantially gas-tight chamber in communication with said accumulator inlet,
expansion means within the chamber in communication with the inlet for forming a first fluid-tight, variable volume for containment of sufficient phase-change fluid to prevent transfer of heat to the condenser when the water in the vessel reaches a predetermined temperature, and
means for exerting a force on the expansion means for forcing effectively all of the phase-change fluid out of the accumulator when the temperature of the water in the vessel is below the predetermined temperature;

(d) a solar collector having
a phase-change fluid upper outlet below the condenser inlet,
a phase-change fluid lower inlet above the location of the point of fluid connection of the accumulator inlet to the apparatus, and
means for exposing a phase-change fluid heat transfer medium in the collector to solar energy;

(e) a gas-tight first conduit means connecting the condenser inlet to the condenser outlet;

(f) a gas-tight second conduit means connecting the accumulator inlet, collector inlet, and condenser outlet; and (g) a phase-change fluid heat transfer medium located within the closed network apparatus formed by the conduit means, condenser, collector, and accumulator.

13. The apparatus of claim 12 wherein
(c) said accumulator further includes means in the chamber forming a second volume separated from the first volume by the expansion means, and means for selecting the pressure in the second volume to predetermine the temperature of the water in the vessel at which movement of heat from the collector to the condenser will cease.

14. A phase-change heat collection system comprising:

a condenser having
 a fluid inlet and
 a fluid outlet, said condenser being operatively positioned relative to a heat transfer means for transfer of heat from said condenser to a condensing fluid within said heat transfer means, said heat transfer means having
 a fluid inlet and
 a fluid outlet for passage of a relatively low temperature condensing fluid therethrough;

a heat collector located so as to be exposed to a relatively high temperature and having
 a fluid inlet and
 a fluid outlet;

first fluid passage means interconnecting said collector fluid outlet and said condenser fluid inlet such that the former is lower than the latter;

second fluid passage means interconnecting said condenser fluid outlet and said collector fluid inlet;

a phase-change heat transfer fluid medium within a closed fluid circuit formed by said first and second fluid passage means, said condenser, and said collector; and means attached to said closed fluid circuit for accumulating the fluid medium when the condensing fluid in said heat transfer means reaches a predetermined temperature, thereby essentially preventing further transfer of heat from said collector to said condenser until the temperature of the condensing fluid in said heat transfer means is below the predetermined temperature, said accumulating means being connected to said closed fluid circuit below said collector fluid inlet and comprising variable volume means for containing said fluid medium when the condensing fluid in said heat transfer means reaches the predetermined temperature and means for adjustably exerting a pressure upon said variable volume means to thus control the pressure of said fluid medium in said closed circuit and thus control the predetermined temperature of the condensing fluid in said heat transfer means at which heat transfer is stopped.

15. The system of claim 14 wherein
said accumulating means includes
 substantially airtight means enclosing said variable volume means and
 said adjustable pressure means comprises
  means for controlling the pressure of air within said airtight means on the side of said variable volume means opposite the phase-change heat transfer fluid medium.

16. The system of claim 14 wherein
said heat collector comprises
 solar collector means oriented so as to collect solar energy.

* * * * *